United States Patent [19]
Tsuruta

[11] 3,921,688
[45] Nov. 25, 1975

[54] SELF-COOLING TIRE

[76] Inventor: Yasuo Tsuruta, No 22-2, 4-chome, Sanno, Ota, Tokyo, Japan

[22] Filed: Sept. 13, 1973

[21] Appl. No.: 396,704

[30] Foreign Application Priority Data
Apr. 26, 1973  Japan.............................. 48-47493

[52] U.S. Cl.............. 152/330 C; 152/153; 152/354
[51] Int. Cl.² ......................................... B60C 19/06
[58] Field of Search................ 152/153, 330 C, 354

[56] References Cited
UNITED STATES PATENTS

| | | | |
|---|---|---|---|
| 2,475,199 | 7/1949 | Reynolds ............................ | 152/153 |
| 2,537,442 | 1/1951 | Carriker............................. | 152/153 |
| 2,948,321 | 8/1960 | Mote.................................. | 152/153 |
| 3,077,743 | 2/1963 | Castro et al. ...................... | 152/153 |
| 3,101,110 | 8/1963 | Vandenberg....................... | 152/153 |
| 3,515,195 | 6/1970 | Sperberg........................... | 152/153 |

*Primary Examiner*—Drayton E. Hoffman
*Attorney, Agent, or Firm*—Steinberg & Blake

[57] ABSTRACT

A tire containing in itself heat absorbing means and also including means for dissipating heat to the atmosphere. A plurality of elements made of different metals are embedded in the body of the tire and connected to the rim portions of a wheel. When electric current is passed through the elements and the rim portions, the so-called "Peltier effect" is induced at the junction of said metals and heat around there is efficiently absorbed.

10 Claims, 1 Drawing Figure

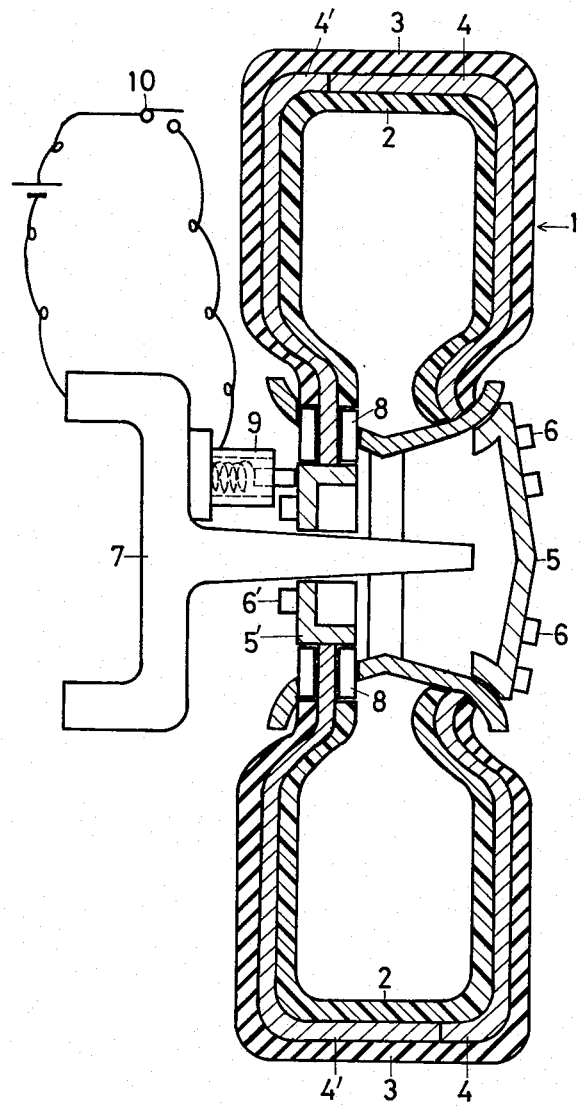

SELF-COOLING TIRE

BACKGROUND OF THE INVENTION

This invention relates to a self-cooling tire for vehicles such as automobiles, airplanes, etc., and more particularly to a tire which can effectively radiate and/or absorb the heat produced and accumulated in itself when, for example, tires are subjected to a violent frictional contact with the road surfaces.

In general, a tire is mainly made of rubber and textile materials having an extremely low thermal conductivity (about $1.6 \times 10^{-3}$ w/cm deg., for rubber). It is therefore very difficult to dissipate thermal energy in the tire generated due to, for example, the so-called standing wave phenomenon and as a result such thermal energy has a tendency to be accumulated in the tire. Under such circumstances, when tires are operated continuously for a long time at a high speed, separation of tread rubber from the carcass will be caused through the fusion of the tread rubber, with serious damage to the tire. This often causes serious accidents.

SUMMARY OF THE INVENTION

It is therefore one object of the present invention to provide a tire which can effectively dissipate heat into the atmosphere, notwithstanding that substantial heat is generated upon, for instance, abrupt braking of a vehicle and cooling fins are not rotated for dissipating heat into the atmosphere.

It is another object of the invention to provide a tire which can absorb heat accumulated in the tire and cool itself effectively even though the cooling fins are not operating efficiently.

For this purpose, the tire according to the present invention comprises metal elements having high thermal conductivity embedded in the form of net or band, which metal elements are connected to plate members of high thermal conductivity including cooling fins exposed to the atmosphere, so that heat accumulated in the tire may be effectively conducted to the plate and dissipated into the atmosphere by way of the cooling fins. At the same time, with the tire according to the present invention, the above mentioned metal elements are made of two metal groups having a thermoelectric power and arranged such that the "Peltier effect" may be provoked when a direct current is passed through the metal elements. By disposing the junction of the two groups of the metal elements in the midst of the tire body, the heat accumulated in the tire is absorbed through mere application of electric current to the metal elements.

Other objects, features and advantages of the present invention will become apparent from the following description, taken in conjunction with the accompanying drawing illustrating by way of example a preferred embodiment of this invention.

BRIEF DESCRIPTION OF THE DRAWING

The FIGURE is a sectional view, illustrating schematically the internal structure of the tire in accordance with the invention and also illustrating the body of a vehicle.

DETAILED DESCRIPTION OF THE INVENTION

Referring now to the drawing, a tire is represented generally at reference numeral 1 and illustrated as including an inner textile layer 2 and an external rubber layer 3. There is interposed between the above two layers 2 and 3 an intermediate layer 4, 4' made of two kind of metals, for example iron and copper, having a high thermal conductivity and having a thermoelectric power inducing the "Peltier effect." These metals are arranged in the form of a wire, net or band and constitute the layer 4, 4'. One end of iron wire 4 is connected to a plate member or an earth (grounded) rim 5 made of a material having a good thermal conductivity. The earth rim 5 includes cooling fins 6 and is grounded to a body portion 7 of a vehicle. On the other hand, copper wire 4' is connected at one end thereof to another plate member or a plus (positive) rim 5' made of a material also having a good thermal conductivity. This plus rim 5' also includes cooling fins 6' but it is electrically insulated from the body portion 7 of a vehicle by means of an insulating means formed by member 8. The plus rim 5' is in contact with a brush 9 electrically insulated from the body portion 7, and in turn the brush 9 may be connected to the anode side of a suitable power source via switch means 10.

Since the connections between the iron wire 4 and the earth rim 5 and also between the copper wire 4' and the plus rim 5' are only for the purpose of conducting the thermal energy accumulated inside the tire to the outside and establishing an electric circuit therebetween, it is not necessarily required to securely connect these members respectively but it will be sufficient to ensure electrical contact therebetween.

With the arrangement as above described, when vehicle such as automobile, airplane, etc. carrying the tires according to the invention continues to run for a long while at a high speed or is subjected to an abrupt braking under heavy loading, and as a result heat is generated due to the standing wave phenomenon of the tire and through friction with the road surface, the heat is conducted, through the earth rim 5 and the plus rim 5' to cooling fins 6, 6', and efficiently dissipated to the atmosphere.

When a vehicle is running at a high speed on a road, in which case heat is liable to be accumulated in the tire, the heat could be dissipated to the atmosphere efficiently through the cooling fins 6 and 6' since they are rotated also at a high speed being exposed directly to the atmosphere. Thus, when the temperatures of the iron wire 4 and the copper wire 4' rise higher owing to the thermal energy accumulated in the tire, temperature gradients along iron wire 4, earth rim 5 and cooling fins 6, and along copper wire 4', plus rim 5' and cooling fins 6' are increased correspondingly. By virtue of these temperature gradients, the thermal energy inside the tire can efficiently be conducted through iron wire 4 and copper wire 4', to cooling fins 6 and 6', and dissipated therefrom to the atmosphere. Thus, temperature rise of the tire is restrained appreciably.

On the other hand, in the case where a vehicle is subjected to an abrupt braking, the heat generated through violent frictional contact with the road surface can not be efficiently dissipated to the atmosphere through the cooling fins 6 and 6' since these fins are not rotated at all, and therefore their cooling efficiency is extremely low. In such circumstances, when electric current is passed through brush 9, plus rim 5', copper wire 4' and iron wire 4 to earth rim 5 by closing the switch 10, the "Peltier effect" is induced at the junction of the copper wire 4' and the iron wire 4 and the heat around the junction is absorbed. Thus, temperature rise inside the tire can be prevented, even though the cooling fins 6, 6' can not operate efficiently.

Tires in accordance with the present invention will be advantageously applied in jumbo jet airplanes so that damage of the tires due to the heat at the time of landing can be eliminated to a considerable extent.

While the principles of the invention have been described above in connection with a specific embodiment thereof, it is to be clearly understood that this description is made only by way of example and not as a limitation on the scope of the invention.

What is claimed is

1. For use in a vehicle wheel, a tire having a circular wall portion, and at least two different metals embedded in said wall portion for thermally conducting heat away from the latter, said two different metals engaging each other in said wall portion to form a junction between said metals in said wall portion, support means situated outside of said tire, and electrical circuit means also situated outside of said tire and being carried by said support means and connected to said metals for providing at said junction a cooling of said wall portion due to the Peltier effect.

2. The combination of claim 1 and wherein said circular wall portion of said tire is an outer peripheral wall portion of the tire.

3. The combination of claim 1 and wherein said circuit means and wheel include a pair of rim portions respectively engaged by said different metals so that heat is conducted to said rim portions by said metals.

4. The combination of claim 3 and wherein said rim portions respectively have cooling fins.

5. The combination of claim 3 and wherein one of said rim portions forms a positive component of said circuit means while the other of said rim portions is grounded.

6. The combination of claim 5 and wherein said circuit means includes a brush engaging said rim portion which forms said positive component of said circuit, and a source of current having a positive terminal connected to said brush.

7. The combination of claim 6 and wherein said circuit means includes a switch for opening and closing said circuit.

8. The combination of claim 1 and wherein said tire has an outer rubber layer and an inner textile layer between which said metals are located.

9. The combination of claim 1 and wherein one of said metals is iron and the other of said metals is copper.

10. The combination of claim 1 and wherein said metals are in the form of wires embedded in said tire.

* * * * *